US012715018B2

United States Patent
Liu et al.

(10) Patent No.: US 12,715,018 B2
(45) Date of Patent: Aug. 25, 2026

(54) AUTOMATIC PRODUCTION APPARATUS WITH CONVEYOR SYSTEM FOR FLOCKING PAD

(71) Applicant: ZHEJIANG UNIVERSITY, Hangzhou (CN)

(72) Inventors: Yingjun Liu, Hangzhou (CN); Chao Gao, Hangzhou (CN); Jiahao Lu, Hangzhou (CN); Zhen Xu, Hangzhou (CN); Bo Wang, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 566 days.

(21) Appl. No.: 18/138,138

(22) Filed: Apr. 24, 2023

(65) Prior Publication Data

US 2023/0338985 A1 Oct. 26, 2023

(30) Foreign Application Priority Data

Apr. 24, 2022 (CN) ......................... 202210456082.5

(51) Int. Cl.
*B05C 19/00* (2006.01)
*B05B 7/14* (2006.01)
*B05C 19/06* (2006.01)
*B65H 35/00* (2006.01)

(52) U.S. Cl.
CPC ............ *B05C 19/002* (2013.01); *B05B 7/145* (2013.01); *B05C 19/06* (2013.01); *B65H 35/0013* (2013.01); *Y02P 70/50* (2015.11)

(58) Field of Classification Search
CPC .................................................. B05C 19/002
USPC ................................................. 118/630–633
See application file for complete search history.

(56) References Cited

U.S. PATENT DOCUMENTS 2,223,476 A * 12/1940 Amstuz .................. D04H 11/00 118/235
2,686,733 A * 8/1954 Burridge ............... B05C 19/002 427/463
2,976,839 A * 3/1961 Okma .................... D04H 11/00 118/640
3,332,395 A * 7/1967 Heyl ..................... B05C 19/002 118/624
3,529,986 A * 9/1970 Kappas .................. D04H 11/00 427/479
3,591,403 A * 7/1971 Sheehan ............... B05C 19/002 427/463

(Continued)

*Primary Examiner* — Karl Kurple

(57) ABSTRACT

An automatic production apparatus for high-thermal-conductivity flocking pad includes a conveyor belt system, a cutting assembly, an electrostatic flocking assembly, a perfusion device and a thermosetting device, wherein the electrostatic flocking assembly is connected to a power supply which is configured for outputting a step-wave voltage through a bottom screen mesh thereof. The polymer matrix is conveyed through the conveyor belt system, and is stretched, flocked in the step-wave electric field, shrunk, poured and dried to form a flocking pad product with high-thermal-conductivity. In this invention, the polymer matrix is stretched and shrunk to make the flocking be dense by regulating and controlling the speed of the conveyor belt system, a step-wave electric field is provided during the flocking process, and meanwhile, the flocking, pouring and curing time is regulated and controlled.

3 Claims, 2 Drawing Sheets

(56) References Cited

U.S. PATENT DOCUMENTS

| | | | | | |
|---|---|---|---|---|---|
| 4,034,134 | A * | 7/1977 | Gregorian | B05D 1/16 156/719 |
| 4,312,293 | A * | 1/1982 | Hakim | B05C 19/001 118/63 |
| 4,435,442 | A * | 3/1984 | Hefele | D06Q 1/06 427/206 |
| 4,456,860 | A * | 6/1984 | Cann | G05D 3/20 318/632 |
| 4,505,224 | A * | 3/1985 | Kranz | B05C 19/002 118/636 |
| 4,836,137 | A * | 6/1989 | Heine | B05B 14/42 118/631 |
| 5,108,777 | A * | 4/1992 | Laird | B05D 1/14 427/8 |
| 5,865,933 | A * | 2/1999 | Morin | D06C 23/00 156/308.4 |
| 5,873,973 | A * | 2/1999 | Koon | B29C 70/543 156/272.4 |
| 6,197,251 | B1 * | 3/2001 | Hashimoto | H01M 10/345 419/24 |
| 6,845,283 | B2 * | 1/2005 | Popp | B32B 37/00 700/130 |
| 2010/0092687 | A1 * | 4/2010 | Sumida | D01D 5/0061 137/15.04 |

* cited by examiner

AUTOMATIC PRODUCTION APPARATUS WITH CONVEYOR SYSTEM FOR FLOCKING PAD

CROSS-REFERENCE TO RELATED APPLICATIONS

This application claims priority to Chinese Patent Application No. 202210456082.5 filed on Apr. 24, 2022, the entire contents of which are hereby incorporated by reference.

TECHNICAL FIELD

This invention relates to the field of automatic production, in particular to an automatic production apparatus for high-thermal-conductivity flocking pad.

BACKGROUND

With the rapid development of the field of electronic integrated circuits, there is an increasing demand for thermal interface materials (TIMs), wherein high-thermal-conductivity flocking pads have received increasing attention due to their excellent flexibility and superior vertical thermal conductivity, as well as can be cut to any shapes according to need. Generally, thermal conductive fillers with high thermal conductivity, including aluminum oxide, zinc oxide, boron nitride, silicon nitride, graphene, carbon fibers, and etc., are added into the polymer to obtain TIMs with excellent performance.

However, in the existing TIMs, the thermal conductive fillers are generally doped into the polymer matrix by random blending, and it is difficult to form an effective dispersion and thus form a thermal conduction path due to the random distribution of the thermal conductive fillers in the matrix. Therefore, it is necessary to add a large amount of thermal conductive fillers and an improvement to the thermal conductivity of the composite material is limited.

Currently, some studies have attempted to induce alignment of materials with large aspect ratios, such as carbon fibers. Generally, for drastically improving the directional properties of polymer blends and polymer nanocomposites, a great deal of research has been devoted to field assisted assembly using electric, magnetic, stress and so on, so as to reorient the disorderly distributed carbon fibers under the action of the external field. However, due to the excessive viscosity resistance of the matrix, the proportion of aligned carbon fibers obtained by this method is actually very limited, and the energy consumption is huge, which increases the cost. There are also attempts to directly grow oriented carbon nanotubes by chemical vapor deposition (CVD), and then compound them with the polymer matrix under oriented conditions. However, this method has high requirements for the growth method and production cost of carbon nanotubes, which is difficult to meet the needs of industrial large-scale production.

Therefore, the present invention provides an automatic production apparatus based on a manufacturing process of thermal conductive pads with high flocking density, high orientation and high vertical thermal conductivity, not only meeting the continuous and large-scale production needs, but also solving some problems in existing electrostatic flocking, such as low flocking density, irregular flocking products, low orientation and etc., by improvements based on mature electrostatic flocking technology.

SUMMARY

In view of the shortcomings of the prior art, an object of the present invention is to provide an automatic production apparatus for high-thermal-conductivity flocking pad, which has the advantages of high flocking density, production automation, and etc., effectively solving the technical problems in the background.

An automatic production apparatus for high-thermal-conductivity flocking pad provided by the present invention includes:

a conveyor system for conveying polymer matrix;

an electrostatic flocking assembly for flocking on the polymer matrix;

a perfusion device for pouring on the flocked polymer matrix to form a composite;

and a thermosetting device for curing the poured polymer matrix;

the conveying system including at least a first conveyer belt, a second conveyer belt and a third conveyer belt;

the electrostatic flocking assembly being arranged above the second conveyer belt, and the perfusion device and the thermosetting device being arranged above the third conveyer belt;

the polymer matrix being conveyed from the first conveyer belt to the second conveyer belt for flocking, and then conveyed to the third conveyer belt for pouring resin and curing and rotary speeds of the first conveyer belt and the third conveyer belt both being lower than the rotary speed of the second conveyer belt.

In some embodiments, the electrostatic flocking assembly includes a flocking box, a high-voltage power supply and a grounded plate, the flocking box is configured for accommodating staple fibers and includes a bottom screen mesh bottom face, the high-voltage power supply includes a positive output terminal connected to the bottom screen mesh bottom face, and the screen mesh bottom face and the grounded plate are located at two sides of the second conveyer belt, respectively.

In some embodiments, the apparatus further includes a cutting assembly which includes a cutting blade, a fiber reel, a draw-off roller and a vibration conveyer plate, fibers on the fiber reel being pulled to a cutting area by the draw-off roller and cut into staple fibers by the cutting blade, the cut staple fibers being vibrated and dispersed by the vibration conveyer plate and then input to the flocking box of the electrostatic flocking assembly.

In some embodiments, the vibration conveyer plate includes a front end located below the cutting blade and a rear end located above the flocking box, and is inclined downwardly by degrees from the front end to the rear end.

Compared with the prior art, the present invention has the following advantages and beneficial effects:

(1) By means of the conveyor system with conveyer belts of different rotary speeds, the "stretching-shrinking" process to the flocking rubber polymer matrix can effectively improve the flocking density of the staple fibers and further improve the vertical thermal conductivity of the thermal conductive pad;

(2) The automatic production apparatus for the high-thermal-conductivity flocking pad can realize the functions of flocking, pouring and curing through the cooperation of the various components, so as to realize the stable output of the quality and quantity of the high-thermal-conductivity flocking pad;

(3) By means of the vibrating conveyer plate, the fibers can be effectively dispersed to prevent fiber agglomeration, which is convenient for subsequent flocking process, so as to obtain a thermal conductive pad with high flocking density, good fiber orientation, and high vertical thermal conductivity;

(4) By means of the flocking assembly, the whole electrostatic flocking device is placed in the flocking box, which can effectively prevent the entry of a large amount of dust and impurities after long-term operation, and provide protection for components against dust, temperature, and humidity; and (5) By means of the power supply, step-wave voltage is provided to realize gradient electrostatic flocking based on the electric field, and the flocking density can be effectively increased.

1 cutting assembly;
101 cutting blade;
102 fiber reel;
103 draw-off roller;
104 auxiliary locator;
105 vibrating conveyer plate;
2 conveyor system;
201 first conveyer belt;
202 second conveyer belt;
203 third conveyer belt;
3 electrostatic flocking assembly;
301 flocking box;
302 high voltage power supply;
303 grounded plate;
4 perfusion device; and
5 thermosetting device.

DESCRIPTION OF THE EMBODIMENTS

For better illustrating the technical means, creative features, objects and effects of the present invention, detailed description will be given for the embodiments provided by the present invention with reference to the append drawings. It should be understood that the specific embodiments described here are only used to explain the present invention, not to restrict the present invention.

Figure 1:
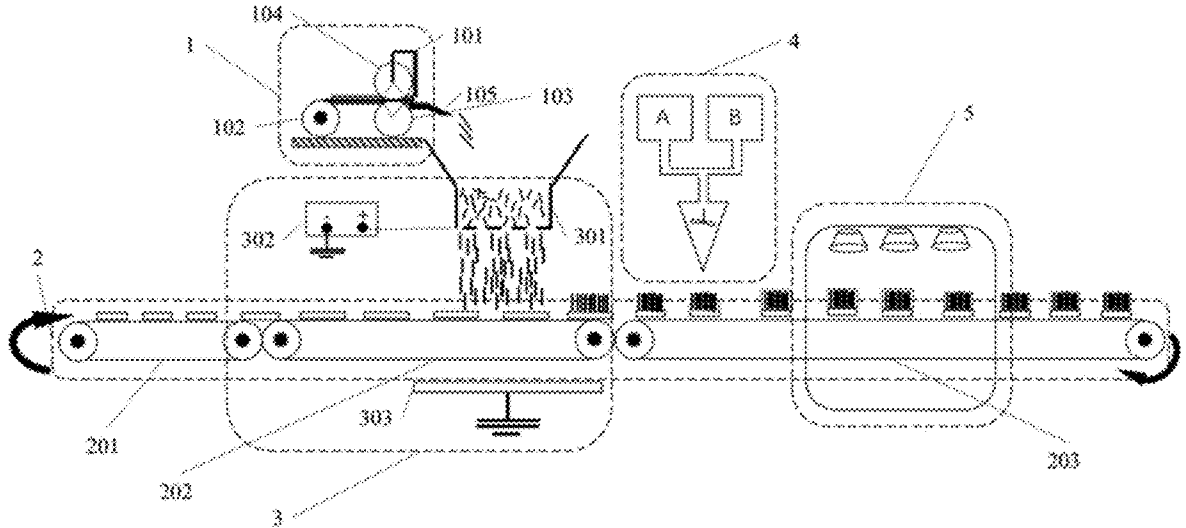
FIG. 1 is a schematic view of an automatic production apparatus for high-thermal-conductivity flocking pad.

Referring to FIG. 1, the present invention provides an automatic production apparatus for high-thermal-conductivity flocking pad, which includes:

a conveyor system 2 for conveying a polymer matrix;

an electrostatic flocking assembly 3 for flocking on the polymer matrix;

a perfusion device 4 for pouring on the flocked polymer matrix to form a composite; and a thermosetting device 5 for curing the poured polymer matrix.

the conveyor system 2 at least includes a first conveyer belt 201, a second conveyer belt 202, and a third conveyer belt 203; the electrostatic flocking assembly 3 is arranged above the second conveyer belt 202, and the perfusion device 4 and the thermosetting device 5 are arranged above the third conveyer belt 203; the polymer matrixes are conveyed from the first conveyer belt 201 to the second conveyer belt 202 for flocking in sequence, and then conveyed to the third conveyer belt 203 for pouring resin and curing, and rotary speeds of the first conveyer belt 201 and the third conveyer belt 203 both are lower than the rotary speed of the second conveyer belt 202.

The polymer matrix which is stretchable, adhesive, and has a required size is adhered to the first conveyer belt 201, and conveyed to the second conveyer belt 202. The rotary speed of the second conveyer belt 202 is set to be greater than the rotary speed of the first conveyer belt 201, the polymer matrix is stretched when it is conveyed from the first conveyer belt 201 to the second delivery bel 202. The polymer matrix after stretched remains its stretched state, and then electrostatic flocking is performed on the polymer matrix when it passes through the flocking assembly 3. The polymer matrix after flocked is conveyed to the third conveyer belt 203. The rotary speed of the third conveyer belt 203 is set to be less than the rotary speed of the second conveyer belt 202, so that the polymer matrix shrinks when it is conveyed from the second conveyer belt 202 to the third conveyer belt 203, resulting in a dense arrangement of flocked staple fibers. Resin is poured through the perfusion device 4, and then the resin is solidified and molded through the thermosetting device 5.

Further, a tensile ratio of the stretchable polymer matrix is regulated by the speed ratio of the first conveyer belt 201 to the second conveyer belt 202 of the conveyor system 2. An electrostatic flocking time of the staple fibers is regulated by the speed of the second conveyer belt 202. A curing time of the thermosetting device is regulated by the speed of the third conveyer belt 203.

In the drawings, the electrostatic flocking assembly 3 includes a flocking box 301, a high-voltage power supply 302, and a grounded plate 303. The flocking box 301 is used to accommodate staple fibers and includes a conductive bottom scree mesh. An output voltage of the high-voltage power supply 302 is a gradually increased step-wave voltage. A positive output terminal of the high-voltage power supply 302 is connected to the bottom scree mesh. The bottom scree mesh and the grounded plate 303 are located at two sides of the conveyer belt, respectively, and cooperatively form a high-voltage electric field, polarizing the staple fibers and inserting them vertically into the stretched polymer matrix for flocking.

In the drawings, the automatic production apparatus further includes a cutting assembly 1, which includes a cutting blade 101, a fiber reel 102, a draw-off roller 103, an auxiliary locator 104, and a vibrating conveyer plate 105. The fiber reel 102 is positioned at a lateral side of the cutting blade 101. Fibers on the fiber reel 102 are pulled to a cutting area by the draw-off roller 103, and are cut by the cutting blade 101 to form staple fibers. The cut staple fibers are vibrated and dispersed through the vibrating conveyer plate 105 and then input to the electrostatic flocking box 301 of the electrostatic flocking assembly 3 for standby.

In the drawings, a plastic sleeve of the auxiliary locator 104 is matched with the fiber bundle in size and is fixed, which is able to prevent the fibers from swinging during the cutting process and in turn prevent uneven size of the fibers.

In the drawings, addition silicone rubber is used in the perfusion device 4, and components A and B are respectively stirred and mixed evenly before perfusion of the prepared staple fiber array.

In the drawings, a plurality of polymer matrixes are arranged on the first conveyer belt to realize the continuous production of high-thermal-conductivity flocking pad. Considering issues such as tensile ratios, it is necessary to reasonably design the distance between two neighboring polymer matrixes. Assume that the rotary speed ratio of the first conveyer belt (a1) to the second conveyer belt (a2) is consistent with the tensile ratio of the polymer matrix, and the rotary speed of the third conveyer belt (a3) is less than or equal to the rotary speed of the first conveyer belt (a1). The specific rotary speed (a2) of the second conveyer belt is determined by the flocking time of the fibers. The specific rotary speed (a3) of the third conveyer belt is determined by the curing time of the poured polymer matrix. The relationship between the distance (d) of neighboring polymer matrixes and the length (l) of the polymer matrixes on the first conveyer belt needs to meet the following equation:

$$\frac{l+d}{l} > \frac{a1}{a3}$$

Preferably, the cut staple fibers are conveyed to the flocking box 301 through the vibrating conveyer plate 105. The vibrating conveyer plate 105 has a front end located below the cutting blade 101 and a rear end located above the flocking box 301, and is inclined downwardly by 30 degrees from the head end to the tail end. By means of the vibrating conveyer plate, the fibers are effectively dispersed, which prevents the fibers aggregation and facilitates subsequent flocking process, thereby obtaining a thermal conductive pad with high flocking density, good fiber orientation and high vertical thermal conductivity (22.59 W/mK).

The process of preparing the thermal conductive pad by the apparatus of FIG. 1 is as follows:

Embodiment 1

Figure 2:
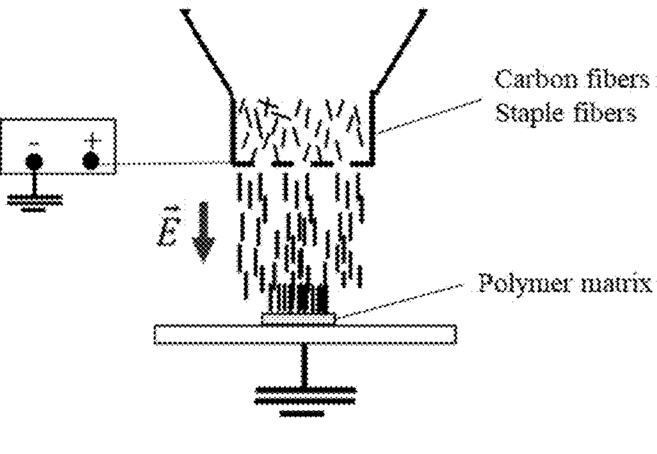
FIG. 2 is a schematic view of the principle and effect of electrostatic flocking.
Figure 3A:
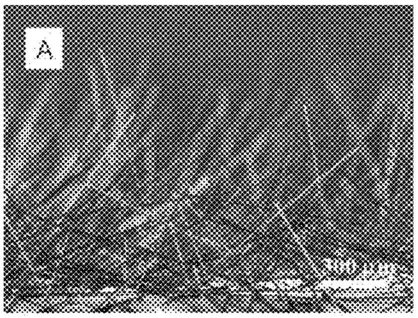
FIG. 3A shows a SEM image of vertical-oriented carbon staple fiber arrays, which are obtained under the condition of: the rotary speed ratio of the conveyer belts a1:a2:a3=1:1:1, and high voltage.
Figure 3B:
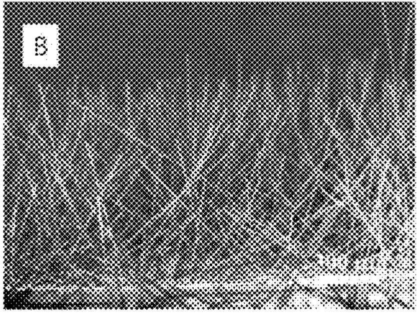
FIG. 3B shows a SEM image of vertical-oriented carbon staple fiber arrays, which are obtained under the condition of: the rotary speed ratio of the conveyer belts a1:a2:a3=4:6:3, and high voltage.

The apparatus is started, the tensile ratio of the polymer matrix before and after stretching is set to 1:1.5, the speed ratio of the first, second and third conveyer belts are set to a1:a2:a3=4:6:3. Firstly, the polymer matrix which is made of elastic acrylic acid with a size of 3 cm*3 cm is put on a front end of the first belt 201, wherein the distance d between neighboring polymer matrixes is 3.5 mm, and conveyed to the rear end and then conveyed to the second conveyer belt 202. At the same time, the carbon fibers with a diameter of 5 um is pulled from the fiber reel 102 by the draw-off roller 103, passing through the auxiliary locator 104, and cut into staple fibers with a uniform length of 1 mm by the cutting blade 101. The staple fibers will be vibrated and dispersed by the vibrating conveyer plate 105 and then enter the electrostatic flocking device 3. The high-voltage power supply 302 outputs a voltage of 20 kV directly through the positive output terminal to the bottom screen mesh. The elastic acrylic polymer matrix is stretched for the speed difference between the first conveyer belt 201 and the second conveyer belt 202, and then conveyed to a top side of the grounded plate 303 through the second conveyer belt 202. The flocking principle is shown in FIG. 2: the carbon staple fibers are polarized and charged, and inserted vertically into the elastic acrylic polymer matrix which is at the top side of the second conveyer belt 202 when they pass through a high potential difference region of the flocking box 301 formed between the bottom screen mesh and the grounded plate 303. As the second conveyer belt 202 exits the high potential difference region, the maximum flocking density is reached, and a vertical-oriented carbon staple fiber array is prepared. An image of such array obtained by SEM (scan electron microscope) is shown in FIG. 3B. The prepared carbon staple fiber array will be conveyed along with the second conveyer belt 202 to the third conveyer belt 203, and will be shrunk for the rotary speed difference between the second conveyer belts 202 and the third conveyer belt 203. Subsequently, in the perfusion device 4, components A and B of addition type silicone gel are fully mixed in 1:1 ratio and then poured into the carbon staple fiber array. After being cured and compounded by the thermosetting device 5, a composite thermal conductive pad with highly aligned carbon fiber is prepared.

Comparative Example 1

Compared with embodiment 1, the difference is merely in step 1. After the apparatus is started, the tensile ratio of the polymer matrix before and after stretching is set to 1:1, and the speed ratio of the first, second and third conveyer belts are set to a1:a2:a3=1:6:1. The image of the prepared vertical-oriented carbon staple fiber array obtained by SEM is shown in FIG. 3A.

Embodiment 2

The apparatus is started, the tensile ratio of the polymer matrix before and after stretching is set to 1:1.5, the speed ratio of the first, second and third conveyer belts are set to a1:a2:a3=4:6:3. Firstly, the polymer matrix which is made of elastic acrylic acid with a size of 3 cm*3 cm is put on a front end of the first belt 201, wherein the distance d between neighboring polymer matrixes is 3.5 mm, and conveyed to the rear end and then conveyed to the second conveyer belt 202. At the same time, the carbon fibers with a diameter of 5 um is pulled from the fiber reel 102 by the draw-off roller 103, passing through the auxiliary locator 104, and cut into staple fibers with a uniform length of 1 mm by the cutting blade 101. The staple fibers will be vibrated and dispersed by the vibrating conveyer plate 105 and then enter the electrostatic flocking device 3. The high-voltage power supply 302 outputs a step-wave voltage through the positive output terminal to the bottom screen mesh. The specific steps for applying a step electric field are as follows: firstly, an electric field with a voltage of 5 kV is applied, and then the voltage of the electric field is raised to 10 kV after flocking for 5 seconds, and then the voltage of the electric field is raised to 20 kV after flocking for 5 seconds.

Figure 3C:
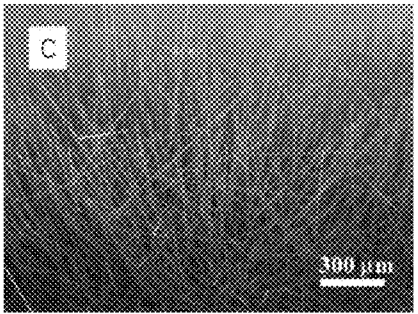
FIG. 3C shows a SEM image of vertical-oriented carbon staple fiber arrays, which are obtained under the condition of: the rotary speed ratio of the conveyer belts a1:a2:a3=4:6:3, and a step-wave voltage.

The elastic acrylic polymer matrix is stretched for the speed difference between the first conveyer belt 201 and the second conveyer belt 202, and then conveyed to a top side of the grounded plate 303 through the second conveyer belt 202. The flocking principle is shown in FIG. 2: the carbon staple fibers are polarized and charged, and inserted vertically into the elastic acrylic polymer matrix which is at the top side of the second conveyer belt 202 when they pass through a high potential difference region of the flocking box 301 formed between the bottom screen mesh and the grounded plate 303. As the second conveyer belt 202 exits the high potential difference region, the maximum flocking density is reached, and a vertical-oriented carbon staple fiber array is prepared. An image of such array obtained by SEM (scan electron microscope) is shown in FIG. 3C. The prepared carbon staple fiber array will be conveyed along with the second conveyer belt 202 to the third conveyer belt 203, and will be shrunk for the rotary speed difference between the second conveyer belts 202 and the third conveyer belt 203. Subsequently, in the perfusion device 4, components A and B of addition type silicone gel are fully mixed in 1:1 ratio and then poured into the carbon staple fiber array. After being cured and compounded by the thermosetting device 5, a composite thermal conductive pad with highly aligned carbon fiber is prepared.

The thermal conductivities of the thermal conductive pads prepared by Embodiment 1, Embodiment 2 and Comparative example 1 are tested using ASTM-D5470 as the testing standard.

The thermal conductivity of the thermal pads obtained in Examples 1 and 2 and Comparative Example 1 was tested, wherein ASTM-D5470 is taken as the detection standard.

TABLE 1

Thermal conductivities of the thermal conductive pads of Embodiments 1, 2 and Comparative example 1

| | Thermal conductivity (W/mK) |
|---|---|
| Embodiment 1 | 14.08 |
| Embodiment 2 | 22.59 |
| Comparative example 1 | 10.61 |

Combining the data in FIGS. 3A-3C and Table 1, it can be seen that adjusting the speed of the conveyor system to stretch and shrink the flocking polymer matrix to obtain high flocking density, and controlling the output step-wave voltage of the high-voltage power supply can effectively improve the thermal conductivity of the final thermal conductive pads, which has a good application prospect.

What is claimed is:

1. An automatic production apparatus for a flocking pad, comprising:

a conveyor system for conveying a polymer matrix;

an electrostatic flocking assembly for flocking on the polymer matrix to form a flocked polymer matrix;

a cutting assembly comprising a cutting blade, a fiber reel, a draw-off roller and a vibration conveyer plate, fibers on the fiber reel being pulled to a cutting area by the draw-off roller and cut into staple fibers by the cutting blade, the cut staple fibers being vibrated and dispersed by the vibration conveyer plate and then input to the electrostatic flocking assembly;

a perfusion device for pouring a resin on the flocked polymer matrix to form a composite; and a thermosetting device for curing the composite;

wherein the conveyor system comprises at least a first conveyer belt, a second conveyer belt, and a third conveyer belt;

the electrostatic flocking assembly is arranged above the second conveyer belt, and the perfusion device and the thermosetting device are arranged above the third conveyer belt;

the polymer matrix is conveyed from the first conveyer belt to the second conveyer belt for flocking, and then the polymer matrix is conveyed to the third conveyer belt for receiving the resin and curing the resin, and rotary speeds of the first conveyer belt and the third conveyer belt both are lower than the rotary speed of the second conveyer belt.

2. The automatic production apparatus according to claim 1, wherein the electrostatic flocking assembly comprises a flocking box for accommodating the cut staple fibers after being vibrated and dispersed by the vibration conveyer plate of the cutting assembly.

3. The automatic production apparatus according to claim 2, wherein the flocking box comprises a bottom screen mesh bottom face connected to a power supply.

* * * * *